US008711424B2

(12) United States Patent
Chikuma et al.

(10) Patent No.: US 8,711,424 B2
(45) Date of Patent: Apr. 29, 2014

(54) IMAGE PROCESSING APPARATUS, IMAGE PRINTING APPARATUS AND PRINTING DATA GENERATION METHOD

(75) Inventors: Toshiyuki Chikuma, Kawasaki (JP); Hidehiko Kanda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1157 days.

(21) Appl. No.: 11/841,160

(22) Filed: Aug. 20, 2007

(65) Prior Publication Data

US 2008/0049237 A1 Feb. 28, 2008

(30) Foreign Application Priority Data

Aug. 23, 2006 (JP) .................................. 2006-227179

(51) Int. Cl.
*G06F 15/00* (2006.01)

(52) U.S. Cl.
USPC ............. 358/1.2; 358/1.8; 358/1.9; 358/1.13; 358/1.16; 347/40; 347/43; 347/9

(58) Field of Classification Search
USPC .............. 347/9, 37, 61, 43, 40; 358/1.9, 1.13, 358/1.16, 1.8, 1.2
See application file for complete search history.

(56) References Cited

U.S. PATENT DOCUMENTS

| 5,684,931 | A | * | 11/1997 | Hagar | 358/1.8 |
|---|---|---|---|---|---|
| 5,768,484 | A | * | 6/1998 | Arai et al. | 358/1.16 |
| 6,137,521 | A | * | 10/2000 | Matsui | 347/225 |
| 6,161,919 | A | * | 12/2000 | Klassen | 347/43 |
| 6,199,968 | B1 | * | 3/2001 | Katakura et al. | 347/9 |
| 6,305,775 | B1 | | 10/2001 | Ohtsuka et al. | 347/15 |
| 6,602,003 | B2 | | 8/2003 | Kakutani | |
| 6,702,425 | B1 | * | 3/2004 | Yip et al. | 347/40 |
| 6,866,365 | B1 | * | 3/2005 | Neese et al. | 347/43 |
| 6,877,833 | B2 | | 4/2005 | Teshigawara et al. | 347/15 |
| 6,969,155 | B2 | * | 11/2005 | Umezawa | 347/61 |
| 7,134,328 | B2 | * | 11/2006 | Komatsu et al. | 73/168 |
| 7,245,402 | B2 | * | 7/2007 | McCrea et al. | 358/3.3 |
| 7,413,272 | B2 | * | 8/2008 | Shamoun et al. | 347/14 |
| 2004/0085555 | A1 | * | 5/2004 | Kato | 358/1.9 |
| 2005/0122355 | A1 | | 6/2005 | Kanda et al. | |
| 2005/0213134 | A1 | * | 9/2005 | Chikuma et al. | 358/1.13 |
| 2005/0243126 | A1 | * | 11/2005 | Takahashi et al. | 347/40 |

FOREIGN PATENT DOCUMENTS

| JP | 10-016251 | 1/1998 |
|---|---|---|
| JP | 2000-118008 | 4/2000 |
| JP | 2000-253247 A | 9/2000 |
| JP | 2001-157055 A | 6/2001 |

(Continued)

OTHER PUBLICATIONS

Office Action dated Oct. 5, 2010 in JP 2006-227179.

(Continued)

*Primary Examiner* — Ashish K Thomas
(74) *Attorney, Agent, or Firm* — Fitzpatrick, Cella, Harper & Scinto

(57) ABSTRACT

In an image processing apparatus, a data amount of printing data generated for each different size of dot is reduced. Specifically, in quantization to obtain data for each printing head, printing data for a large dot is set as data in which a bit number per pixel is two bits, and printing data for a medium or small dot is set as data in which a bit number per pixel is one bit. Thereby, a data amount per pixel can be reduced compared with data in which all bit numbers per pixel for the large, medium and small dots are equally two bits.

8 Claims, 11 Drawing Sheets

(56) References Cited

FOREIGN PATENT DOCUMENTS

| | | |
|---|---|---|
| JP | 2002-171392 A | 6/2002 |
| JP | 2002-185790 A | 6/2002 |
| JP | 2002-301815 | 10/2002 |
| JP | 2004-98468 | 4/2004 |
| JP | 2005-169754 | 6/2005 |
| JP | 2005-238661 | 9/2005 |

OTHER PUBLICATIONS

Office Action dated Mar. 11, 2011 in JP 2006-227179.
Japanese Office Action dated Nov. 25, 2011 in corresponding Japanese Application No. 2011-131603 (with English-language translation).
Japanese Office Action dated Aug. 7, 2013, in counterpart Japanese Patent Application No. 2011-131603, and English translation thereof.

* cited by examiner

| EMBODIMENT | PRINTING DOT SIZE | BITS PER PIXEL | OUTPUT GRADATION LEVEL NUMBER |
|---|---|---|---|
| CYAN PRINTING HEAD | 5pl (LARGE) | 2 | 4 |
| | 2pl (MEDIUM) | 1 | 2 |
| | 1pl (SMALL) | 1 | 2 |
| MAGENTA PRINTING HEAD | 5pl (LARGE) | 2 | 4 |
| | 2pl (MEDIUM) | 1 | 2 |
| | 1pl (SMALL) | 1 | 2 |
| YELLOW PRINTING HEAD | 5pl (LARGE) | 2 | 4 |
| | 2pl (MEDIUM) | 1 | 2 |
| BLACK PRINTING HEAD | 5pl (LARGE) | 2 | 4 |
| | 2pl (MEDIUM) | 1 | 2 |

FIG.6A

| COMPARATIVE EXAMPLE | PRINTING DOT SIZE | BITS PER PIXEL | OUTPUT GRADATION LEVEL NUMBER |
|---|---|---|---|
| CYAN PRINTING HEAD | 5pl (LARGE) | 2 | 4 |
| | 2pl (MEDIUM) | 2 | 3 |
| | 1pl (SMALL) | 2 | 3 |
| MAGENTA PRINTING HEAD | 5pl (LARGE) | 2 | 4 |
| | 2pl (MEDIUM) | 2 | 3 |
| | 1pl (SMALL) | 2 | 3 |
| YELLOW PRINTING HEAD | 5pl (LARGE) | 2 | 4 |
| | 2pl (MEDIUM) | 2 | 3 |
| BLACK PRINTING HEAD | 5pl (LARGE) | 2 | 4 |
| | 2pl (MEDIUM) | 2 | 3 |

FIG.6B

1 BIT DATA

| DATA | PRINTING DOT NUMBER |
|---|---|
| 0 | 0 |
| 1 | 1 |

FIG.7A

2 BIT DATA

| DATA | PRINTING DOT NUMBER |
|---|---|
| 00 | 0 |
| 01 | 1 |
| 10 | 2 |
| 11 | (3) |

FIG.7B

| PRINTER DRIVER UI | BITS PER PIXEL |
|---|---|
| STANDARD | FIG. 6A |
| FINE | FIG. 6B |

FIG.8

IMAGE PROCESSING APPARATUS, IMAGE PRINTING APPARATUS AND PRINTING DATA GENERATION METHOD

BACKGROUND OF THE INVENTION

1. Field of the Invention

The present invention relates to an image processing apparatus, an image printing apparatus and a printing data generation method, and specifically to printing data generation used for a printing apparatus that performs printing by forming different sizes of dots.

2. Description of the Related Art

Printing apparatuses are used as apparatuses that perform printing such as printers, copy machines, and facsimile machines, or output apparatuses for composite electronics apparatuses including such as computers and word processors, workstations and the like. These printing apparatuses are configured so as to print images and the like on printing media such as paper or plastic sheets based on image information (including all output information such as character information).

Among these printing apparatuses, inkjet type apparatuses perform printing by ejecting ink from a printing head onto printing media. This type of printing apparatus has various advantages of easily realizing a higher printing resolution, high speed, low noise and low production cost. An inkjet printing apparatus uses a printing head provided with an ejection opening line, arranged with a plurality of ink ejection openings, for each ink color. Thus the use of a printing head arranged with many ejection openings may improve printing throughput.

In recent years, need for color printing has been increased and there are provided many color inkjet printers capable of high image quality printing comparable to silver halide photography.

A known example of a configuration for inkjet printing apparatus, which is capable of such high image quality printing, performs printing by forming dots with a plurality of sizes for one color (Japanese Patent Laid-Open No. 10-016251 (1998)). This configuration can reduce granularity in a highlight portion of an image by using relatively small dots preferentially and increase density in a dark portion even with fewer dots by using relatively large printing dots preferentially.

Furthermore, Japanese Patent Laid-Open No. 2002-301815 makes a proposal to perform quantization for printing data generation of such dots with a plurality of sizes independently for each of the different sizes of dots in order to improve a degree of freedom in dot arrangement design for printing quality and the like.

However, the configuration, in which printing data generation is performed independently for each different size of dot as described in Japanese Patent Laid-Open 2002-301815, increases an amount of data generated or processed according to the number of sorts of dot size used for printing. In an embodiment of Japanese Patent Laid-Open 2002-301815, dots with two sorts of sizes; large and small, are used for each color of cyan (C), magenta (M) and yellow (Y), and, in this case, printing data of large and small dots for each color is generated by quantization to be 4 bit data, respectively. Therefore, a data amount of 4 bits per one pixel is increased each time a sort of dot size is increased by one for each color. The increase of data amount may cause the following problem.

For example, when printing data is transferred from a host apparatus to a printer, increase of an amount of data to be transferred may cause a situation that transferring is not as fast as printing at the printer side. In such a case where transfer speed of printing data is not as high as printing speed of a printing apparatus, the printing apparatus has to wait for the printing data and is required to stop printing randomly every time waiting of printing data occurs during printing the data, resulting in deterioration of throughput or printing quality.

Not limited to the case where a host apparatus generates printing data, there is also a case that increase of an amount of data to be processed is not preferable even in a configuration in which printing data is generated within a printing apparatus. For example, memory capacity is required to be increased according to a number of dot sizes used for printing, resulting in causing a problem such that usage of the memory is limited in the printing apparatus.

SUMMARY OF THE INVENTION

An object of the present invention is to provide an image processing apparatus, an image printing apparatus and a printing data generation method that are capable of reducing a data amount of printing data generated for each different size of dot.

In the first aspect of the present invention, there is provided an image processing apparatus comprising: generator that generates first printing data for printing a first dot and second printing data for printing a second dot that has a same color as the first dot and has a size smaller than that of the first dot, wherein a bit number per one pixel for the second printing data is smaller than a bit number per one pixel for the first printing data.

In the second aspect of the present invention, there is provided an image processing apparatus comprising: generator that generates first printing data for printing a first dot and second printing data for printing a second dot that has a similar color to the first dot and has a lower density than that of the first dot, wherein a bit number per one pixel for the second printing data is smaller than a bit number per one pixel for the first printing data.

In the third aspect of the present invention, there is provided a printing apparatus that is capable of printing a first dot and a second dot that has a same color as the first dot and has a size smaller than that of the first dot, the apparatus comprising: printing unit that prints the first dot based on a first printing data for printing the first dot and prints the second dot based on a second printing data for printing the second dot that has a same color as the first dot and has a size smaller than that of the first dot, wherein a bit number per one pixel for the second printing data is smaller than a bit number per one pixel for the first printing data.

In the fourth aspect of the present invention, there is provided a printing data generation method comprising: a generation step for generating first printing data for printing a first dot and second printing data for printing a second dot that has a same color as the first dot and has a size smaller than that of the first dot, wherein a bit number per one pixel for the second printing data is smaller than a bit number per one pixel for the first printing data.

According to the above described configuration, the number of bits for printing data of a second dot that has a same color as a first dot and a smaller size than the first dot (or a second dot that has a similar color as a first dot and a lower density than the first dot) is reduced to be smaller than the number of bits for printing data of the first dot. This allows a total data amount of printing data to be generated to be reduces, to decrease time required for data transferring, and to decrease a memory area for storing printing data.

Further features of the present invention will become apparent from the following description of exemplary embodiments (with reference to the attached drawings).

BRIEF DESCRIPTION OF THE DRAWINGS

FIG. 6A is a diagram showing the number of bits and the like of printing data for each of large, medium and small dots for a pixel, according to a first embodiment of the present invention, and FIG. 6B is a similar diagram according to a comparative example;

FIGS. 7A and 7B are diagrams showing relationships between bit data and the number of dots according to the first embodiment;

FIG. 8 is a diagram explaining a relationship between a printing mode and the number of bits per pixel according to a second embodiment of the present invention;

DESCRIPTION OF THE EMBODIMENTS

Figure 1:
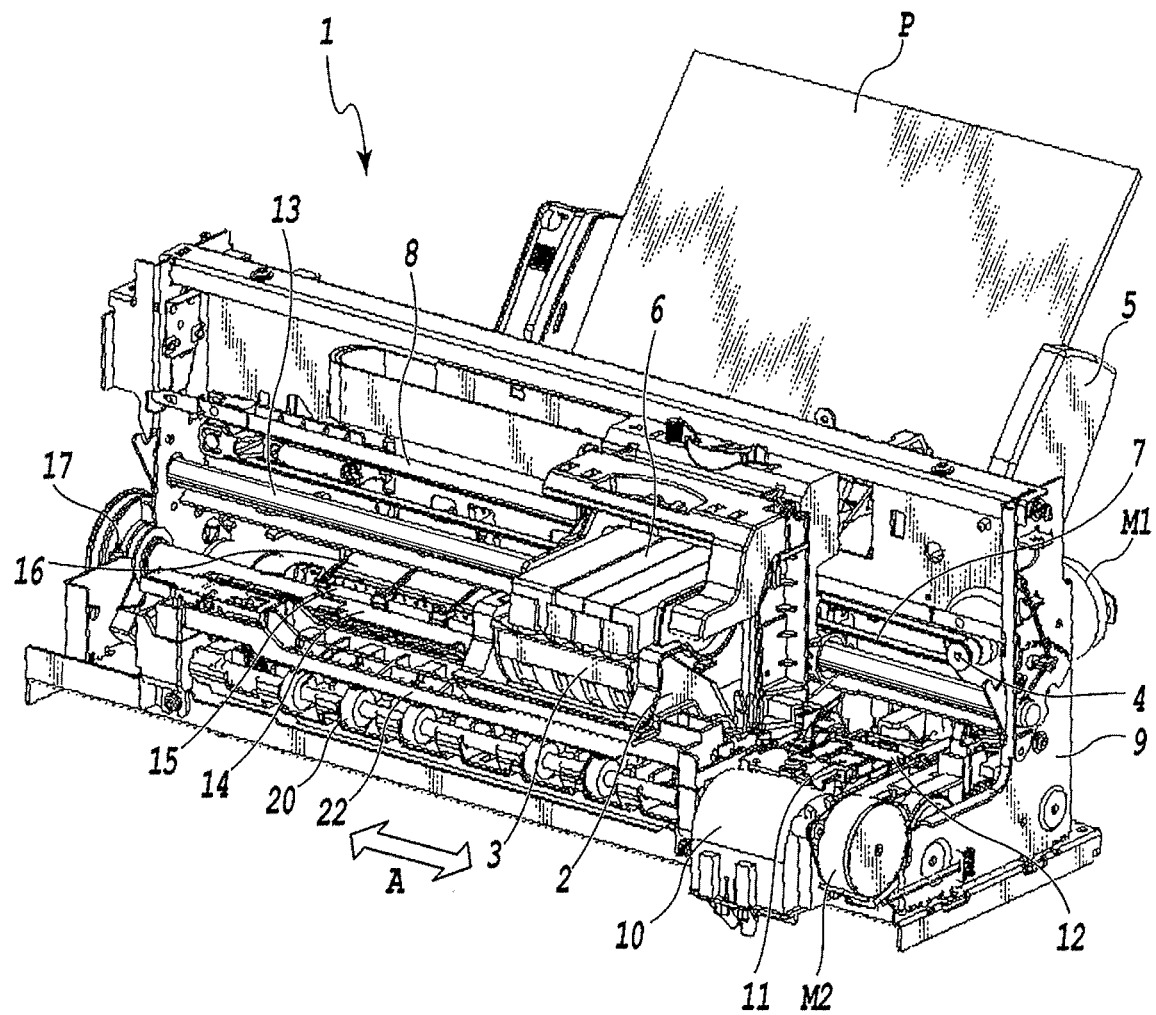
FIG. 1 is a perspective appearance view showing a general structure of an inkjet printer according to an embodiment of the present invention.

Hereinafter, embodiments of the present invention will be described in detail referring to the drawings.
(Embodiment 1)
Explanation of an Inkjet Printing Apparatus FIG. 1 is a perspective appearance view of an inkjet printer according to an embodiment of the present invention. As shown in FIG. 1, an inkjet printer 1 as a printing apparatus includes a carriage 2 detachably mounting a printing head 3 that ejects ink in a way according to a type of inkjet. The carriage 2 can reciprocate in a direction of an arrow A by a driving force of a carriage motor M1 transmitted through a transmission mechanism 4. By this movement, the printing head 3 can scan a printing medium P such as printing paper. Then, printing is performed for the scanning area by ink ejection from the printing head 3 onto the printing medium P during this scanning. There is provided a platen (not shown) that supports a printing medium being transported, corresponding to the scanning area of this printing head 3. A paper feeding mechanism 5 feeds a printing medium into this scanning area. A printing medium transport mechanism also transports the printing medium just across a distance that corresponds to a width of the scanning area for each scanning of the printing head. In this manner, by repeating the scanning of the printing head and the transportation of the printing medium in a predetermined distance, printing can be performed over the whole printing medium.

On the carriage 2, other than the printing head 3, there is detachably mounted an ink cartridge 6 similarly that reserves ink to be supplied to the printing head. In the present embodiment, there are mounted four ink cartridges which contain cyan (C), magenta (M), yellow (Y) and black (K) inks, respectively. The printing head 3 is attached to the carriage 2 in such a way that both contact faces are properly contacted each other to achieve and maintain a required electrical connection. The printing head 3 ejects ink according to printing data that is generated by image processing to be described such as in FIG. 4. The printing head 3 of the present embodiment employs a method of ejecting ink utilizing thermal energy and is provided with an electro-thermal converter for each ejection opening to generate the thermal energy. That is, ink is ejected from the ejection opening utilizing pressure change generated by bubble growth and contraction due to the film boiling caused by applying thermal energy to the ink.

The carriage 2 is coupled to a part of driving belt 7 of the transmission mechanism 4 that transmits a driving force of the carriage motor M1, and slidably supported to be guided in a direction of the arrow A along a guide shaft 13. The carriage 2 can reciprocate thereby along the guide shaft 13 according to a normal rotation and a reverse rotation of the carriage motor M1. Also, there is provided a scale 8 for detecting a position of the carriage 2 along a moving direction of the carriage 2 (the direction of the arrow A). In the present embodiment, the scale 8 is made of a transparent PET film printed with black bars at a required pitch, and firmly fixed to a chassis 9 at one side while supported by a leaf spring (not shown) at the other side.

The transport mechanism for the printing medium P is as follows. In FIG. 1, reference numerals 14 and 15 denote a transport roller driven by a transport motor M2 and a pinch roller pressing the printing medium P against the transport roller 14 by a spring (not shown), respectively. Also, reference numerals 16 and 17 denote a pinch roller holder for rotatably supporting the pinch roller 15 and a transport roller gear firmly fixed to an end of the transport roller 14, respectively. Thus, the transport roller 14 is driven by the rotation of the transport motor M2, the rotation being transmitted to the transport roller gear 17 through an intermediate gear (not shown). Also, reference numeral 20 denotes a discharge roller driven by the transport motor M2 for discharging the printing medium P, on which images have been formed, to outside of the printing apparatus. The printing medium P is pressed by a spur roller (not shown), that has a biasing force of a spring (not shown), against the discharge roller 20. Reference numeral 22 denotes a spur holder for rotatably supporting the spur roller.

A Control Configuration of an Inkjet Printing Apparatus

Figure 2:
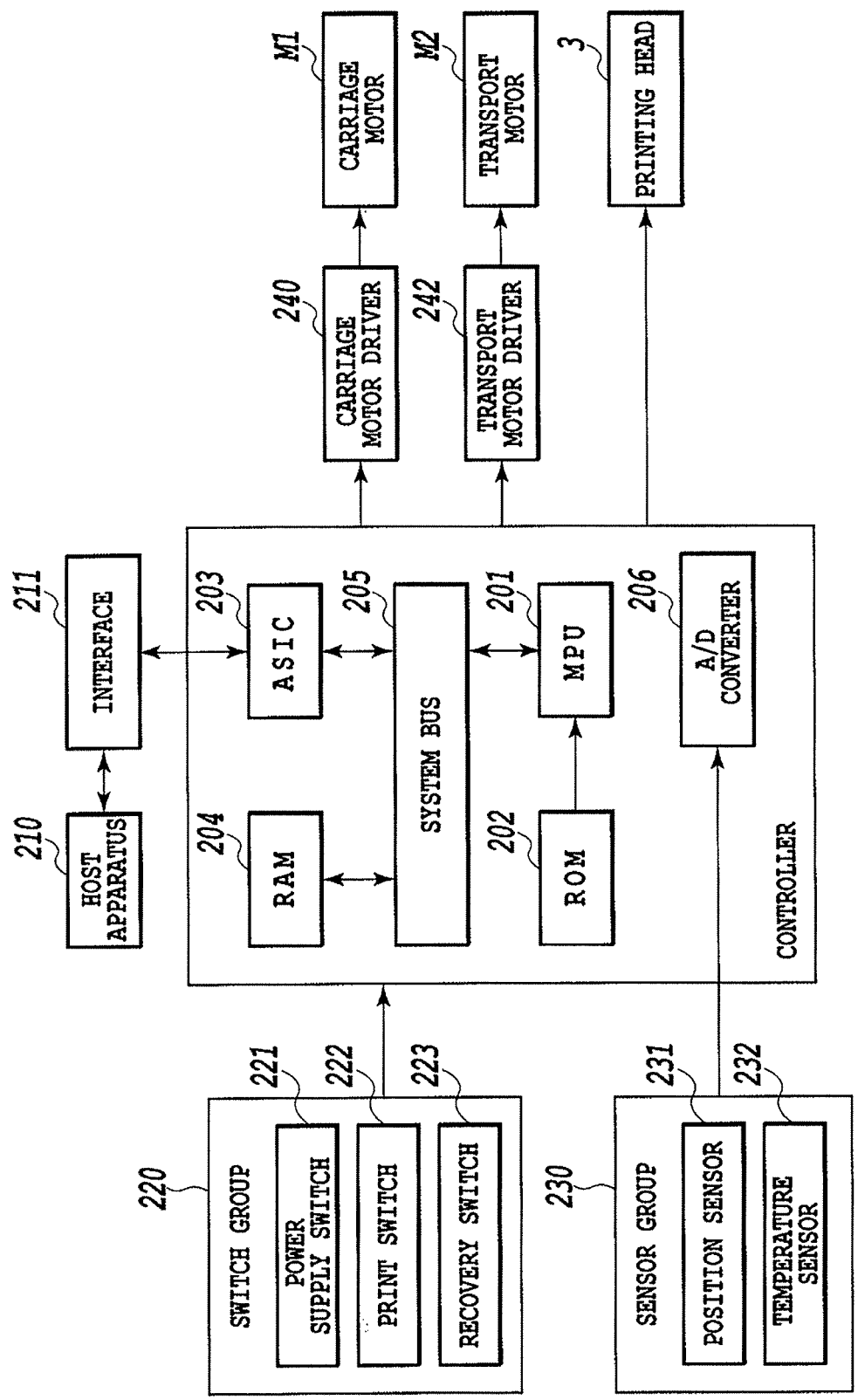
FIG. 2 is a block diagram mainly showing a control configuration of the printer shown in FIG. 1.

FIG. 2 is a block diagram mainly showing a control configuration of the printer shown in FIG. 1.

In FIG. 2, reference numeral 210 denotes a computer that is a supply source of printing data used by a printer and will be hereinafter referred to as a host apparatus as a data supply source. The host apparatus 210 generates printing data by performing image processing shown in FIG. 4. The host apparatus 210 transmits and receives commands, status signals and the like related to print processing, other than the printing data, to and from the printer 1 through an interface (I/F) 211. It should be noted that the host apparatus is explained as an example of a data supply source, but the data supply source is not limited to the host apparatus. For example, the data supply source may be a reader for scanning images, a digital camera, or the like.

In the printer 1, a controller 200 controls printing operation of the printer 1 based on printing data and the like transmitted from the host apparatus 210. Specifically, an MPU 201 performs data processing and/or control of each section according to a program stored in a ROM 202. Dot data generation based on the printing data is performed using an index pattern that corresponds to gradation levels indicated by quantized printing data transmitted from the host apparatus 210 to be described such as in FIG. 4. Then, the generated dot data is expanded in a RAM 204.

The ROM 202 stores fixed data such as necessary tables and the index pattern data, other than the program. In the RAM 204, there are provided an area for printing data expansion, a work area for program execution and the like. An application specific integrated circuit (ASIC) 203 generates control signals for controlling the carriage motor M1 and the transport motor M2, and furthermore for controlling the printing head 3, according to the control of the MPU 201. A system bus 205 is a data path for transmitting and receiving data by connecting the MPU 201, ASIC 203, and RAM 204 with one another. An A/D converter 206 A/D-converts analog signals from a sensor group described subsequently and supplies the converted digital signals also to the MPU 201. When the printing head 3 scans for printing, the ASIC 203 directly accesses a storage area of the RAM 204, and transfers driving data of the electro-thermal converters to printing head drivers, based on dot data therefrom.

A switch group 220 includes a power supply switch 221, a print switch 222 to instruct starting print, a recovery switch 223 to instruct activation of a processing for maintaining ink ejection performance of the printing head 3 in a good condition (recovery processing), etc. These switches allow an operator to enter instructions. A sensor group 230 has a position sensor 231 such as a photo-coupler for detecting a home position, a temperature sensor 232 provided at an appropriate position of the printing apparatus for detecting ambient temperature, etc. These sensors can detect a status of the apparatus. A carriage motor driver 240 drives the carriage motor M1 for reciprocating scanning of the carriage 2 in a direction of the arrow A. A transport motor driver 242 drives the transport motor M2 for transporting the printing medium P.

Printing Head

Figure 3:
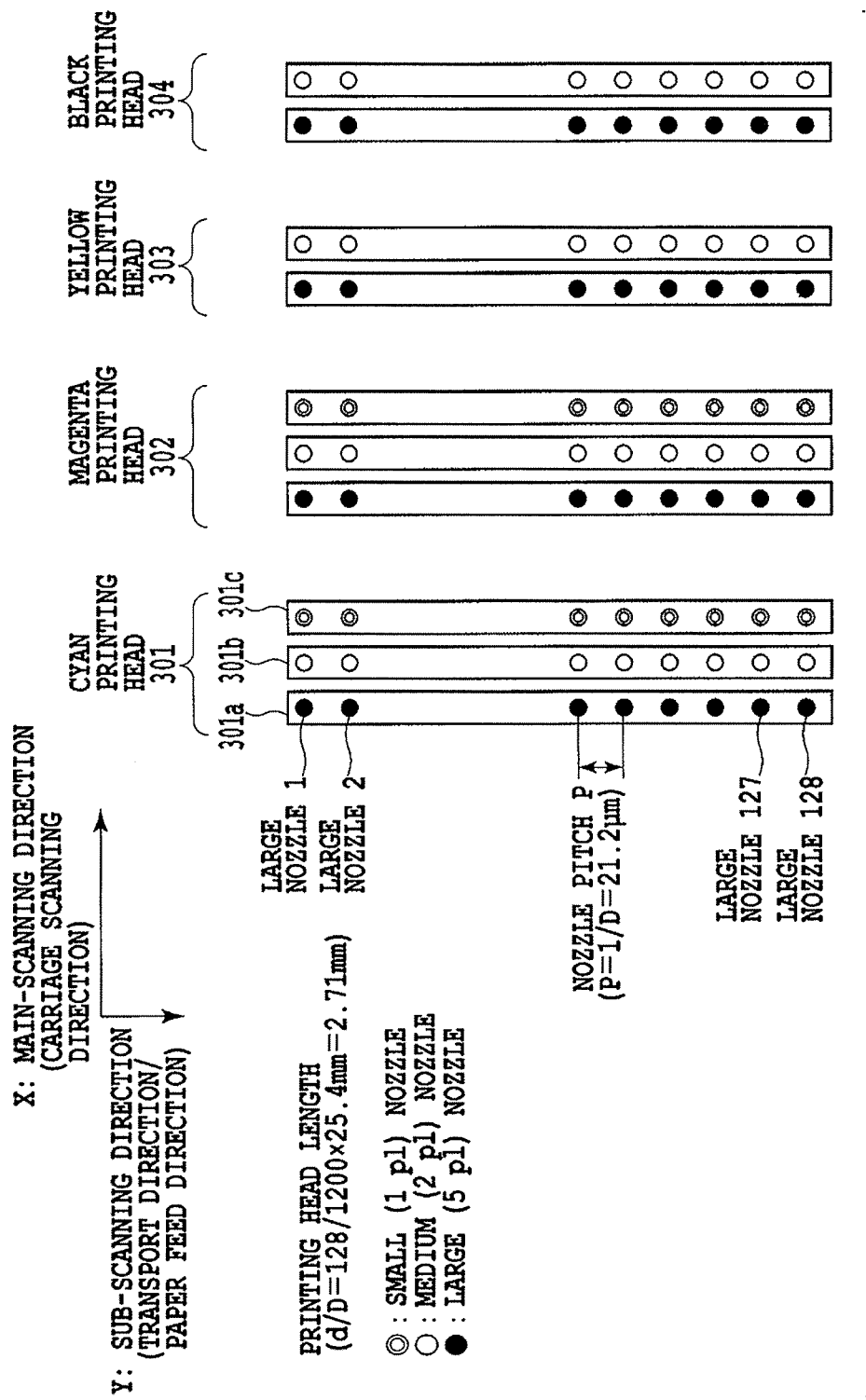
FIG. 3 is a schematic view illustrating details of a printing head used in the printer shown in FIG. 1 and explaining a nozzle arrangement according to an embodiment of the present invention.

FIG. 3 is a schematic view showing the printing head 3 of the present embodiment in detail. In FIG. 3, reference numeral 301 denotes a printing head for cyan ink, reference numeral 302 denotes a printing head for magenta ink, reference numeral 303 denotes a printing head for yellow ink, and reference numeral 304 denotes a printing head for black ink. As shown in the figure, these recoding heads are provided with ejection openings (hereinafter, also referred to as nozzles) each of which ejects an ink droplet different in volume (quantity). The cyan head 301 includes a nozzle array 301a with 5 pl (pico-liter) nozzles (hereinafter, also referred to as large nozzles), a nozzle array 301b with 2 pl nozzles (hereinafter also referred to as medium nozzles), and a nozzle array 301C with 1 pl nozzles (hereinafter also referred to as small nozzles). The magenta head 302 also includes nozzle arrays sizes of ink droplet to be ejected from which are 5 pl, 2 pl and 1 pl, similar to the cyan head. Each of the yellow head 303 and the black head 304 includes 5 pl nozzles (large nozzles) and 2 pl nozzles (medium nozzles). Each of the nozzle arrays of the printing heads for four colors is arranged in a direction of main scan (x) as shown in FIG. 3. With this printing head arrangement, dots formed by ink droplets ejected from each of the large, medium and small nozzles will be a large dot, a medium dot and a small dot, respectively, according to their sizes.

Generation Processing of Printing Data

Figure 4:
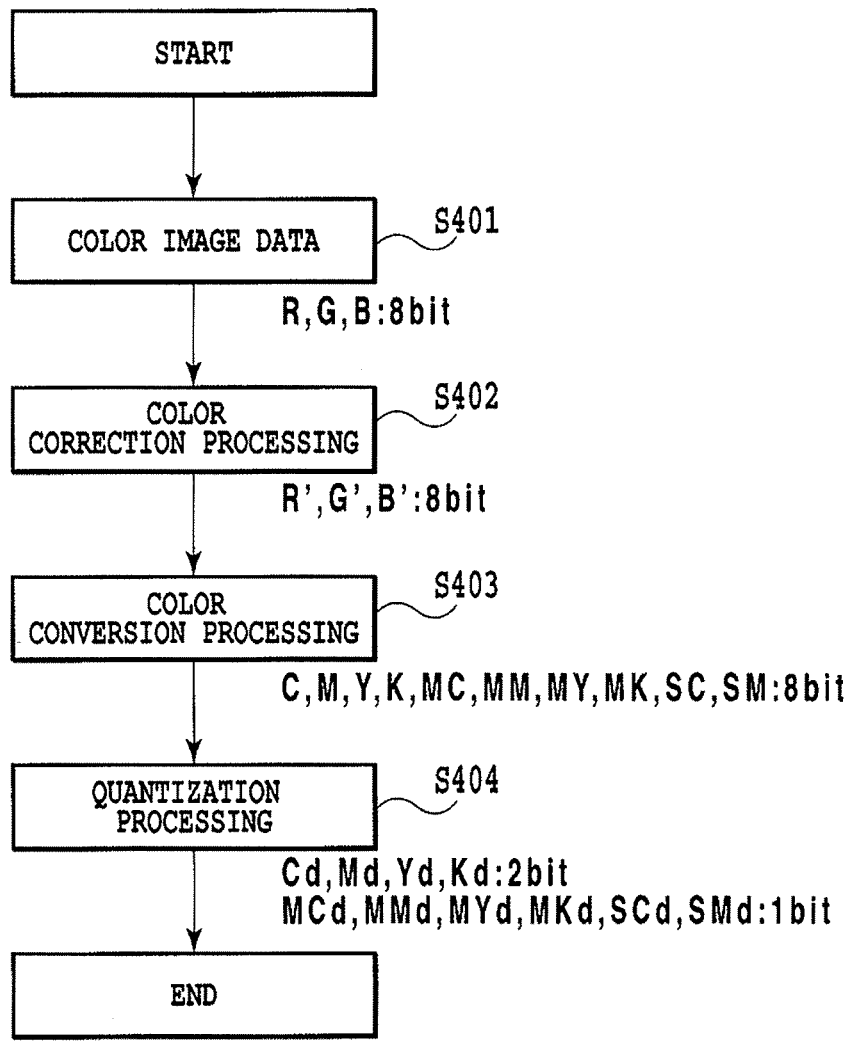
FIG. 4 is a flow chart showing steps of a series of image processing including printing data generation performed in the host apparatus shown in FIG. 2.

FIG. 4 is a flow chart showing a procedure for a series of image processing including printing data generation performed in the host apparatus 210.

Figure 10A:
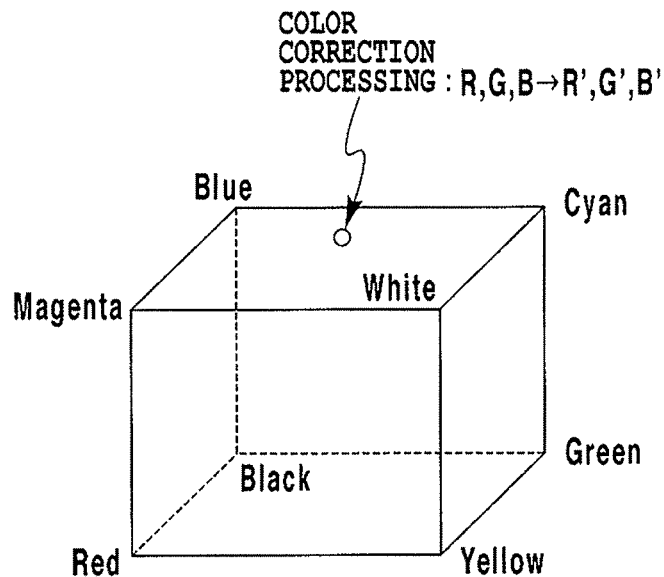
FIGS. 10A and 10B are schematic diagrams explaining LUTs (look-up tables) used for color correction processing and color conversion processing, respectively, according to an embodiment of the present invention.

In a step S401 of FIG. 4, a process is performed first for inputting image data (R, G, and B) (R: red, G: green and B: blue). In the present embodiment, this image data is composed of 8 bit data for each R, G and B, for a pixel. Next, in a step S402, a color correction processing is performed for the image data (R, G and B) and image data (R', G' and B') with eight bits for each color is obtained. By the color correction processing, a color gamut reproducible by an apparatus displaying the input image data is converted to a color gamut reproducible by the printer of the embodiment. In the present embodiment, this color correction processing is performed by using an LUT (look up table). FIG. 10A is a schematic diagram illustrating this LUT. Specifically, in the LUT, the image data (R', G' and B') is obtained by interpolating computation using grid data composing an interpolation space defined by the input image data (R, G and B).

Next, color conversion processing is performed in a step S403. This processing converts the image data (R', G' and B') to printing data of ink color used by the printer. This color conversion processing is performed in units of pixel of the image data (R', G' and B'). In the present embodiment, this color conversion processing provides printing data for each of the large, medium and small nozzles of the printing head. Corresponding to a difference in size of thus formed dots, color conversion is performed so as to obtain printing data for each size of the dot. Specifically, a set of data corresponding to the large, medium and small nozzles is obtained for each color. Here, regarding cyan, a set of data corresponding to the large, medium and small nozzles shown in FIG. 3 is represented as C, MC, and SC, respectively, and similarly regarding magenta, a set of data corresponding to the large, medium and small nozzles is represented as M, MM and SM, respectively. Also regarding yellow, a set of data corresponding to the large and medium nozzles is represented as Y and MY, respectively, and regarding black, a set of data corresponding to the large and medium nozzles is represented as K and MK, respectively. Here, the conversion processing is a processing to obtain a set of printing data (C, M, Y, K, MC, MM, MY, MK, SC and SK) that expresses colors indicated by the image data (R', G' and B'). This color conversion processing is also performed by using an LUT similar to the color correction processing.

Figure 5:
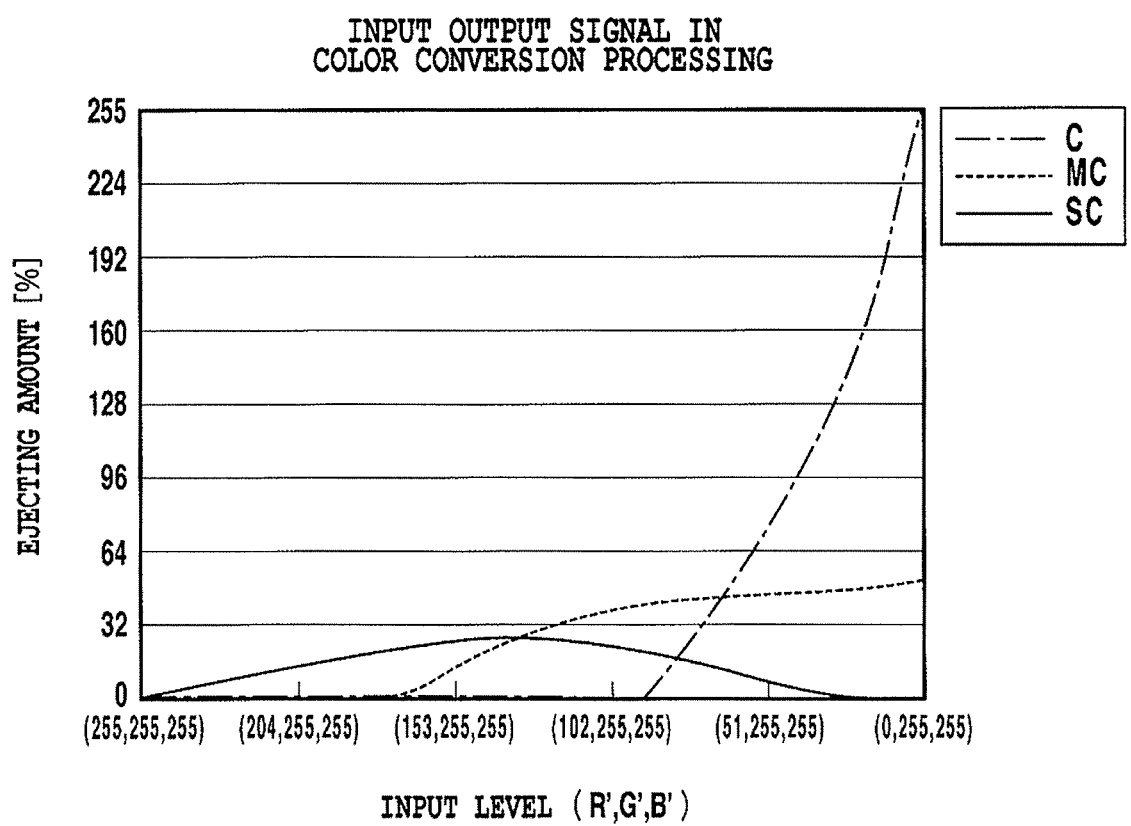
FIG. 5 is a diagram illustrating contents of a color conversion table according to an embodiment of the present invention.
Figure 10B:
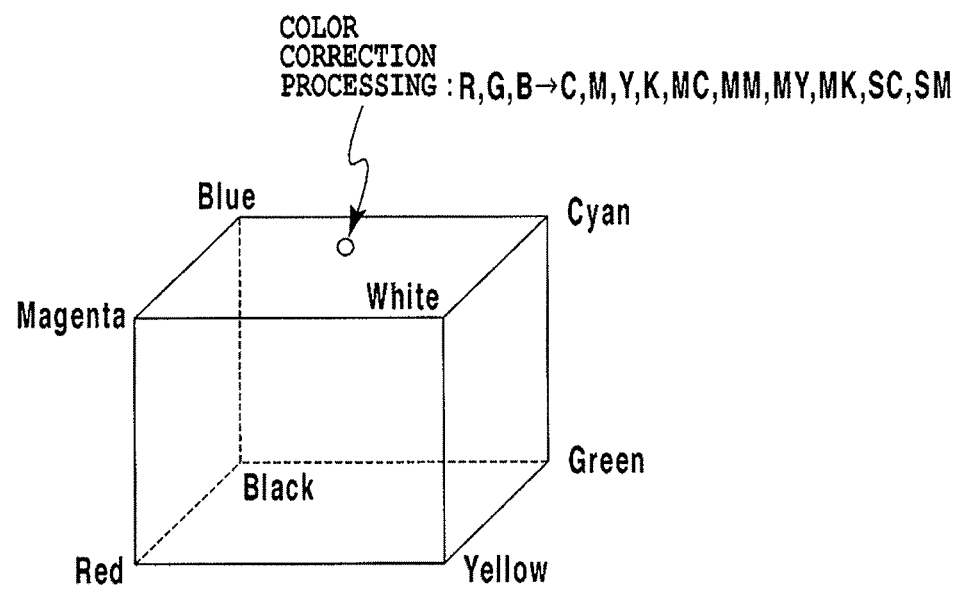

FIG. 10B is a diagram showing schematically the LUT used for the color conversion processing. Also FIG. 5 is a diagram showing values of C, MC and SC, that are the set of data corresponding to the large, medium and small dots of cyan, among the set of printing data (C, M, Y, K, MC, MM, MY, MK, SC and SK) that is obtained by converting colors on a white-cyan line in the LUT shown in FIG. 10B. Here, ejecting amounts of the vertical axis represent respective ejecting amounts for the large, medium and small dots, where an ejecting amount for forming two large dots is assumed to be "255". Contents of an LUT such as shown in FIG. 5 are defined in considering collective color gradation indicated by the image data (R', G' and B'). Accordingly, even if each data corresponding to the large, medium or small dot is generated individually by the color conversion, and quantization is performed independently based on the results, as described below, an image printed based on the dot data obtained thereby will be able to be an image having intended gradation performance and the like.

In a next step S404, quantization processing is performed for the set of printing data with 8 bits for each of C, M, Y, K, MC, MM, MY, MK SC and SM that are obtained by the color conversion processing. Note that quantization processing refers to a processing in which printing data with N (N is an integer equal to or larger than three) bits is converted to printing data with M (M is an integer equal to or larger than one) bits where M is smaller than N. Thus, there is obtained a set of quantized printing data: Cd, Md, Yd, Kd, MCd, MMd, MYd, MKd, SCd, and SMd. In an embodiment of the present invention, the quantization processing is performed differently for each data corresponding to the large, medium or small dot to obtain different numbers of bits for the quantized printing data depending on the dot size, as described below. Particularly in this example, the number of bits per pixel for the large dot printing data is set to be different from that of bits per pixel for the medium or small dot printing data. Thereby the number of gradation levels indicated by the large dot printing data is set to be different from that of gradation levels indicated by the medium or small dot printing data.

In the quantization processing of the present embodiment, the printing data, C, M, Y or K, corresponding to the large dot is quantized to 2 bit printing data, Cd, Md, Yd or Kd. Also, the printing data corresponding the medium or small dots, MM, MY, MK, SC or SM, is quantized to 1 bit printing data, respectively.

Note that these steps of quantization processing are performed by using a known technique such as the dither method or the error diffusion method, but in an embodiment of the present invention, the quantization approach will be obviously different depending on the number of bits of printing data to be quantized. Here, the quantization is performed for each dot size so as to maintain a gradation characteristic considered in the table, contents of which are shown in FIG. 5. Specifically, as described above in FIG. 5, the color conversion table of the present embodiment assumes that an ejecting amount of forming two of the large dots is 255 for a pixel with a size of 600 dpi×600 dpi. Therefore, by using a gradation level (density value) realized by the ejecting amount, for example, as a standard, a threshold level in the dither method or the error diffusion method is determined so as to realize a gradation level according to the ejecting amount for each of the large, medium and small dots.

FIG. 6A is a diagram showing the number of bits and the like in the printing data for each of the large, medium and small dots, for a pixel (with a size of 600 dpi×600 dpi) and for each of the printing heads, according to the present embodiment, while FIG. 6B is a similar diagram according to a comparative example.

A conventional quantization, according to the comparative example shown in FIG. 6B, allots two bits of printing data to all of different sizes of dots without any particular consideration about data amount (bit number) after the quantization. Compared with this, in the present embodiment, sizes of the printing dots are classified into a group with a relatively large size (5 pl) and a group with relatively small sizes (2 pl and 1 pl) in each of the printing heads as shown in FIG. 6A. Then, in the quantization, the number of bits per pixel is set to be two bits for the group of the relatively large dot and the number of bits per pixel is set to be one bit for the group of relatively small printing dots.

Accordingly, while a bit number per one pixel is 20 bits (2 bits×10 colors/dot size) in the comparative example, a bit number per pixel is 14 bits (2 bits×4 colors+1 bit×6 colors/dot size) in the present embodiment. Thus, the present embodiment can reduce the data amount by 6 bits per pixel compared with the comparative example.

FIGS. 7A and 7B are diagrams showing relationships between bit data and dot numbers. FIG. 7A shows the dot numbers when 1 bit data is input, and FIG. 7B shows the dot numbers when 2 bit data is input, respectively.

In the case of the 1 bit data shown in FIG. 7A, output gradation is in two ways; "0" and "1". In the present embodiment, input data "0" indicates to form zero dots and input data "1" indicates to form one dot. That is, the number of output gradation levels is two in the case of the 1 bit data as shown in FIG. 6A.

Similarly in the case of the 2 bit data of FIG. 7B, output gradation is in four ways; "00", "01", "10" and "11". The number of printing dots for the respective input data is zero dot, one dot, two dots or three dots. That is, the number of output gradation levels is four in the case of the 2 bit data as shown in FIG. 6A. Note that, in the present embodiment, there is not a case where three dots with the large size are formed, since two dots of the large size are formed for a maximum ejecting amount of "255" and this is a maximum number of dots for the large size, as in the above description.

As described above, in the present embodiment, a data amount (bit number) for the relatively small dots (the medium and small dots) is set to be smaller than that for the relatively large dot (the large dot) with a same color. Thereby, a maximum dot number printed in a pixel is smaller for the relatively small dots (the medium and small dots) than for the relatively large dot (the large dot).

This is because it is advantageous to reduce the number of dots (i.e., bit number) per pixel for the small or medium dot with 1 pl or 2 pl, from the following reasons:

1. More numbers of the large dots can increase ink volume at a maximum ejecting amount using a same number of dots, resulting in realizing an advantageous configuration for obtaining high density.

2. In a case where smaller dots are formed, that is, less ink volume is ejected, ink ejection becomes weaker against external disturbances, and ink droplet landing becomes easier to be erratic particularly when many dots are formed in a short time.

3. Since kinds of ink ejection volumes have been increased, it comes to be difficult to recognize a problem due to connections between dots with different ejection volumes.

As described above, according to the present embodiment, the bit number per pixel of printing data for the relatively small dots is set to be less than the bit number per pixel of printing data for the relatively large dots. Thereby, an amount of printing data can be reduced without deteriorating image quality or printing speed, more than necessary. Here, although the present embodiment assumes that printing dot sizes are 5 pl for the relatively large group and 2 pl and 1 pl for the relatively small group, it is obvious that there is no particular reason for this assumption. For example, dot sizes may be 5 pl and 2 pl for the relatively large group and 1 pl for the relatively small group. Which classification is desirable is determined as needed depending on such as a printing speed required for a printing apparatus. Also, the number of dots, that is, the number of gradation levels for each bit shown in FIG. 7 is not particularly limited to the above example.

Again referring to FIG. 4, after the quantization processing in the step S404 has been finished, the host apparatus transfers the quantized printing data to the printer 1 to perform printing.

On the other hand, the printer 1 generates dot (binarized) data to be supplied to each of the printing heads by using an index pattern that indicates a dot arrangement (dot arrangement pattern) such as described in Japanese Patent Laid-Open No. 2002-301815, for example. The present embodiment uses an index pattern of 2 pixels×2 pixels with a resolution of 1,200 dpi×1,200 dpi per pixel for quantized printing data with a resolution of 600 dpi×600 dpi. For example, in a case where a dot number indicated by 2 bit data is two (output gradation level is three), there is used an index pattern (dot arrangement pattern) with dots arranged at two predetermined locations in 2 pixels×2 pixels. Also, in a case where a dot number indicated by 1 bit data is one (output gradation level is two), there is used an index pattern with a dot arranged at one predetermined location in 2 pixels×2 pixels. Corresponding to these index patterns, each of the printing heads in the present embodiment has nozzles line up with a density of 1,200 dpi as shown in FIG. 3. Also for scanning, these printing heads are driven at a frequency where dots can be formed with a density of 1,200 dpi in the direction of scanning.

(Modification of the Embodiment 1)

As shown in FIG. 3 or FIG. 6, the Embodiment 1 has described the case where three kinds of dots; the large dot, the medium dot and the small dot, are used for multiple kinds of dots different in size with the same color. In the present invention, however, kinds of dots different in size are not limited to the three kinds mentioned above. For example, another embodiment may use two kinds of dots; a large dot and a small dot, for the multiple kinds of dots different in size with the same color. In the embodiment using two kinds of dots; a large dot and a small dot, a bit number per pixel for the small dot printing data is set to be smaller than a bit number per pixel for the large dot printing data.

Further in another embodiment, for the multiple kinds of dots different in size with the same color, four kinds of dots may be used; a large dot (5 pl), a medium dot (3 pl), a small dot (1 pl) and a micro dot (0.5 pl). In a case of using these four kinds of dots, the numbers of bits per pixel for printing data of the small dot and the micro dot are set to be smaller than the numbers of bits per pixel for printing data of the large dot and the medium dot.

(Embodiment 2)

In the embodiment 1 described above, up to one dot can be formed for the medium dot or the small dot with 1 bit data in a pixel of 600 dpi as shown in FIG. 7A. However, there is a case where an arrangement that enables to form up to two dots is desirable for improving image quality. This is because, for example, at a gradation where dots begin to be formed for printing, printing with small dots as much as possible, rather than medium dots, can make gradation shifts, which are caused by dots beginning to be formed, difficult to be recognized, and may reduce granularity and suppress occurrence of false contours. Also a lower recoding speed can increase data amount of printing data, since a lower printing speed allows a lower printing data transfer speed during the printing. When it is possible to select "standard" or "fine" for image qualities in a printer, usually in the "fine" mode image quality is improved but printing speed is often slower than in the "standard" mode at its expense. This is because priority in printing is placed on image quality rather than speed.

In the present embodiment, as shown in FIG. 8, a printer driver in the host apparatus is provided with a function that allows a user to select printing modes, and a bit number for each color (each nozzle) is switched to be changed when printing data is generated, according to a printing mode selected through the printer driver.

Specifically, the printing modes selectable through the printer driver may be "standard" and "fine". When the "standard" mode is selected, data amounts (bit numbers) for relatively small dot sizes are reduced as in the embodiment 1 described above. On the other hand, when the "fine" mode is selected, a same data amount (bit number) is allotted to all kinds of dots and the number of output gradation levels is set to be three for the medium or small dot as shown in FIG. 6B.

As described above, the present embodiment allows avoiding deterioration in image quality and printing speed more than necessary, since data amount is varied according to printing speeds for the printing modes.

Here, although the present embodiment assumes the two types ("standard" and "fine") of printing modes selectable through the printer driver, it will be obvious that printing modes are not limited to these types. For example, there may be three or more types for the selectable printing modes. As far as an advantage intended by the present embodiment is obtained, data amount may be switched to be changed depending on printing sheet types or sheet sizes for example, that is selectable by the printer driver.

(Embodiment 3)

The host apparatus (an image processing apparatus) 210 that performs a series of image processing shown in FIG. 4 is connected to the inkjet printer through the interface 211 as shown in FIG. 2. Recent inkjet printers have become compatible with many of diversified interfaces (hereinafter described also as "I/F"). Representative I/Fs include a high data transfer speed I/F such as the USB (Universal Serial Bus), the relatively low speed IrDA, the further low speed BT (Blue Tooth) and the like.

By diverting the embodiments 1 and 2 in relation to these I/Fs, another advantage similar to those of the embodiments may be obtained. Considering by replacing "standard" of the embodiment 2 by a low speed I/F and "fine" by a high speed I/F, a data amount (bit number) for relatively small size of dots is set to be smaller as in the embodiment 1, when a low speed I/F is used. Also, when a high speed I/F is used, a same data amount (bit number) is allotted to all kinds of dots as in FIG. 6B. Thus, by discriminating a type of an interface being used and by changing a bit number of printing data to be generated according to a type of the interface, an advantage similar to those of the forgoing embodiments may be obtained.

Thus, according to the present embodiment, a bit number for smaller dot printing data is set to be smaller than that for larger dot printing data, when a second interface (e.g., BT) is used, transfer speed of which is slower than a first interface (e.g., USB).

When the data generation method for I/Fs is switched to another, there is a case that the transfer rate can not be determined definitely depending on types of I/Fs such that the transfer rate varies according to a connection status especially in wireless systems. In such a case, such a configuration may be effective as follows; a PC (host computer) transfers dummy data to a printer and the printer transfers it back to the PC after having received, and then a best way how to treat a data amount is determined, judging from the time required for transferring the dummy data.

(Other Embodiments)

Although the image processing including the printing data generation, described in each of the above embodiments is performed in a host apparatus, it is obvious that embodiments of the present invention are not limited to this configuration. The image processing may be performed in a printing apparatus such as a printer, and particularly the quantization processing, according to an embodiment of the present invention, may be performed in a printing apparatus. In this case, this printing apparatus functions as an image processing apparatus. As above, in the case that a printing apparatus functions as an image processing apparatus, it is preferable to configure such that the selection of the printing modes, described in the embodiment 2, can be also performed at the printing apparatus side.

Further, although each of the above embodiments has been described for the case using dots different in size but with a same color (same hue), embodiments of the present invention are not limited to this case. The present invention may be similarly applied also to a case using dots printed with inks that are similar in color and different in concentration of color material (so called dark and light inks or dark, medium and light inks) (i.e., dots with similar color but different in density). In this case, a bit number per pixel for printing data of relatively light dots (having lower density) printed with a lighter ink is configured to be smaller than a bit number per pixel for printing data of relatively dark (having darker density) dots printed with a darker ink.

Figure 9A:
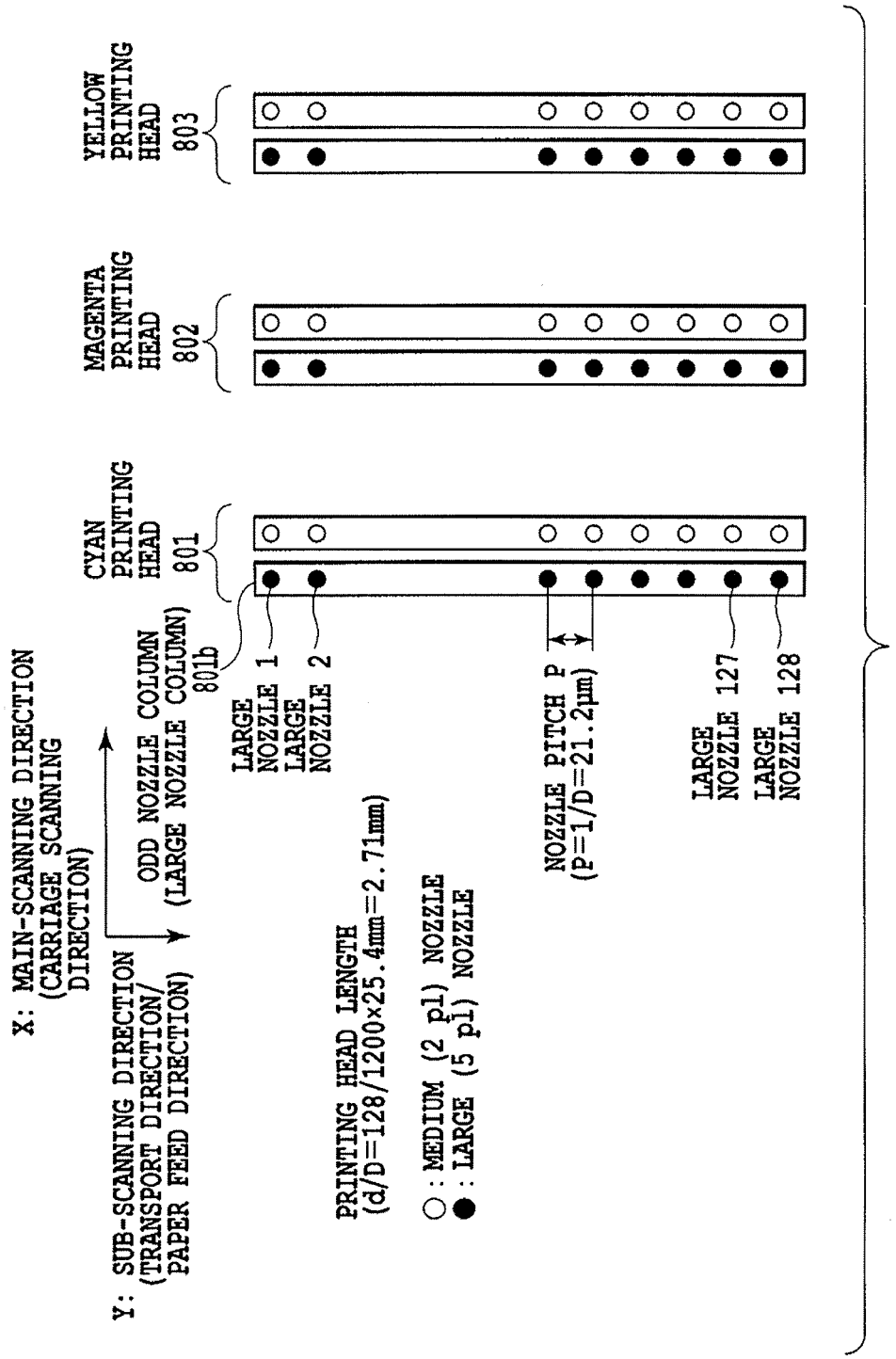
FIGS. 9A and 9B are schematic views explaining a printing head configuration according to another embodiment of the present invention.
Figure 9B:
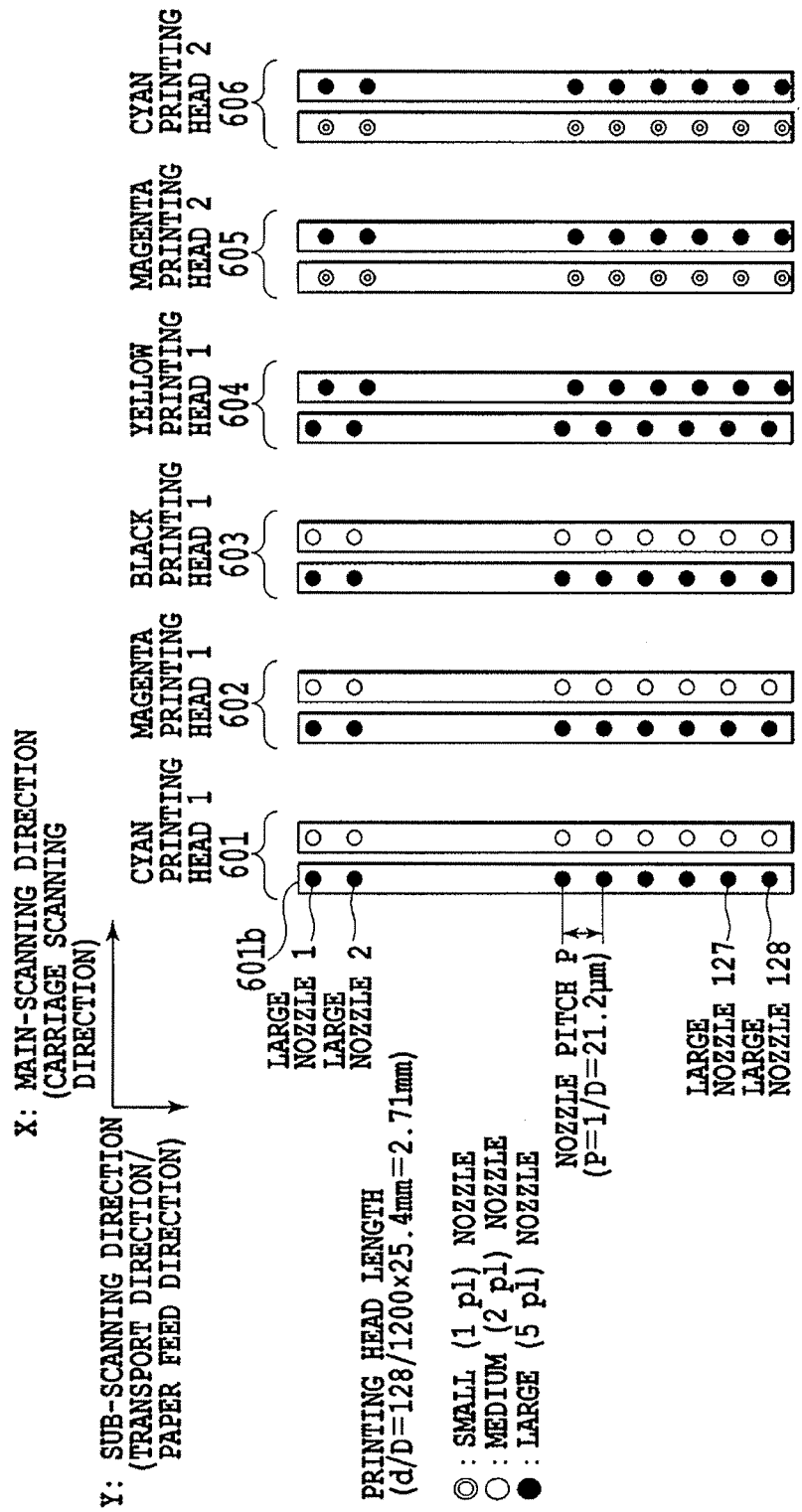

Furthermore, all of the above embodiments are associated with a printer using the printing heads shown in FIG. 3. However, the present invention is not limited to this printing head configuration. For example, the present invention may be applied to any printing apparatus, if the printing apparatus has a printing head with at least two different ejection amounts for the same color (same hue) as shown in FIG. 9A. Also, in a case where printing heads have two 5 pl nozzle arrays for each of cyan, magenta and yellow as shown in FIG. 9B, the two lines for each color may be treated as one color or different nozzle arrays.

As in the above embodiments, reduction in printing data amount is also effective to avoid undesirable transmission of huge print data also in a case where a printer is shared on a network.

The present invention is put into practice by executing program codes of software realizing the quantization processing 403 corresponding to a part of a series of image processing shown in FIG. 4, or by a storage medium storing the above program codes. Also, the preset invention is put into practice by the computer (CPU or MPU) of the system or apparatus reading and executing the program codes. In this case, the program codes of the software themselves implement the functions of the above described embodiments, and thus a storage medium storing such program codes and that program constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-227179, filed Aug. 23, 2006, which is hereby incorporated by reference herein in its entirety.

What is claimed is:

1. An image processing apparatus comprising:
   a generating unit configured to generate print data for printing an image on a print medium by using a print head, wherein the print head is provided with a first nozzle array in which nozzles capable of ejecting ink droplets each having a first size are arranged and a second nozzle array in which nozzles capable of ejecting ink droplets each of which has a second size smaller than the first size and has a same color as the ink droplets ejected from the first nozzle array are arranged; and
   a controlling unit configured to control the print head to eject ink droplets based on the generated print data for printing the image on the print medium,
   wherein in a case that the controlling unit executes a first mode, the generating unit generates the print data so that a number of bits per unit pixel for ejecting ink droplets having the first size to the unit pixel is greater than a number of bits per unit pixel for ejecting ink droplets having the second size to the unit pixel, and
   wherein in a case that the controlling unit executes a second mode, the generating unit generates the print data so that the number of bits per unit pixel for ejecting ink droplets having the first size to the unit pixel is equal to the number of bits per unit pixel for ejecting ink droplets having the second size to the unit pixel.

2. The image processing apparatus according to claim 1, wherein said generating unit generates the print data so that the number of bits per unit pixel for ejecting ink droplets having the second size to the unit pixel is 1 bit.

3. The image processing apparatus according to claim 1, wherein the print head is further provided with a third nozzle array in which nozzles capable of ejecting ink droplets each of which has a third size smaller than the second size and has a same color as the ink droplets ejected from the first and second nozzle arrays are arranged, and said generating unit generates the print data so that the number of bits per unit pixel for ejecting ink droplets having the first size to the unit pixel is greater than a number of bits per unit pixel for ejecting ink droplets having the third size to the unit pixel.

4. The image processing apparatus according to claim 3, wherein said generating unit generates the print data so that the number of bits per unit pixel for ejecting ink droplets having the third size to the unit pixel is 1 bit.

5. The image processing apparatus according to claim 1, wherein the second mode is a print mode for printing an image having higher quality than an image printed by executing the first mode.

6. The image processing apparatus according to claim 1, wherein the second mode is a print mode in which a print speed by the print head is slower than that of the first mode.

7. An image processing method comprising:
   a generating step of generating print data for printing an image on a print medium by using a print head, wherein the print head is provided with a first nozzle array in which nozzles capable of ejecting ink droplets each having a first size are arranged and a second nozzle array in which nozzles capable of ejecting ink droplets each of which has a second size smaller than the first size and has a same color as the ink droplets ejected from the first nozzle array are arranged; and
   a controlling step of controlling the print head to eject ink droplets based on the generated print data for printing the image on the print medium, wherein in a case that a first mode is executed in the controlling step, the generating step generates the print data so that a number of bits per unit pixel for ejecting ink droplets having the first size to the unit pixel is greater than a number of bits per unit pixel for ejecting ink droplets having the second size to the unit pixel, and wherein in a case that a second mode is executed in the controlling step, the generating step generates the print data so that the number of bits per unit pixel for ejecting ink droplets having the first size to the unit pixel is equal to the number of bits per unit pixel for ejecting ink droplets having the second size to the unit pixel.

8. A non-transitory computer-readable storage medium storing a program which causes a computer to execute:

a generating step of generating print data for printing an image on a print medium by using a print head, wherein the print head is provided with a first nozzle array in which nozzles capable of ejecting ink droplets each having a first size are arranged and a second nozzle array in which nozzles capable of ejecting ink droplets each of which has a second size smaller than the first size and has a same color as the ink droplets ejected from the first nozzle array are arranged; and a controlling step of controlling the print head to eject ink droplets based on the generated print data for printing the image on the print medium, wherein in a case that a first mode is executed in the controlling step, the generating step generates the print data so that a number of bits per unit pixel for ejecting ink droplets having the first size to the unit pixel is greater than a number of bits per unit pixel for ejecting ink droplets having the second size to the unit pixel, and wherein in a case that a second mode is executed in the controlling step, the generating step generates the print data so that the number of bits per unit pixel for ejecting ink droplets having the first size to the unit pixel is equal to the number of bits per unit pixel for ejecting ink droplets having the second size to the unit pixel.

* * * * *